(12) United States Patent
Mizutani et al.

(10) Patent No.: US 9,133,711 B2
(45) Date of Patent: Sep. 15, 2015

(54) STEAM TURBINE

(75) Inventors: Yoshihiro Mizutani, Kawasaki (JP); Masao Yamazaki, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 705 days.

(21) Appl. No.: 13/231,305

(22) Filed: Sep. 13, 2011

(65) Prior Publication Data

US 2012/0070269 A1    Mar. 22, 2012

(30) Foreign Application Priority Data

Sep. 16, 2010  (JP) ................. P2010-208105

(51) Int. Cl.
| F01D 9/02 | (2006.01) |
| F01D 1/00 | (2006.01) |
| F01D 25/24 | (2006.01) |
| F01D 9/04 | (2006.01) |
| F01D 11/00 | (2006.01) |
| F02C 7/20 | (2006.01) |

(52) U.S. Cl.
CPC .. *F01D 1/00* (2013.01); *F01D 9/04* (2013.01); *F01D 11/005* (2013.01); *F01D 25/246* (2013.01); *F02C 7/20* (2013.01); *F05D 2220/31* (2013.01); *F05D 2240/14* (2013.01); *F05D 2240/55* (2013.01)

(58) Field of Classification Search
CPC ............................. F01D 9/047; F05D 2240/14
USPC .......................................................... 415/193
See application file for complete search history.

(56) References Cited

U.S. PATENT DOCUMENTS

| 3,746,463 | A | * | 7/1973 | Stock et al. | 415/136 |
| 4,362,464 | A | * | 12/1982 | Stock | 415/136 |
| 4,661,043 | A | * | 4/1987 | Groenendaal et al. | 415/104 |
| 4,697,983 | A | * | 10/1987 | Yamaguchi | 415/134 |
| 4,832,566 | A | * | 5/1989 | Martin | 415/119 |
| 5,152,664 | A | * | 10/1992 | Huang | 415/134 |
| 6,302,648 | B1 | * | 10/2001 | Konishi et al. | 415/193 |
| 6,964,554 | B2 | * | 11/2005 | Groenendaal et al. | 415/202 |
| 2009/0068001 | A1 | * | 3/2009 | Kawakami | 415/193 |

FOREIGN PATENT DOCUMENTS

| JP | 52-106704 U | 8/1977 |
| JP | 58-210303 A | 12/1983 |
| JP | 2009-047123 A | 3/2009 |

* cited by examiner

*Primary Examiner* — Nathaniel Wiehe
*Assistant Examiner* — Brian O Peters
(74) *Attorney, Agent, or Firm* — Foley & Lardner LLP

(57) ABSTRACT

A steam turbine of an embodiment includes: a nozzle box having a circular ring-shaped steam passage into which steam is led from a steam inlet pipe and having, on a downstream portion of the steam passage, a plurality of first-stage nozzles in a circumferential direction; and a second-stage nozzle side structure combined with the nozzle box and having a plurality of at least second-stage nozzles in a circumferential direction. Further, in the respective nozzle box and second-stage nozzle side structure, there are provided at least a pair of abutment surfaces for sealing which are not parallel to a turbine rotor axis and abutting each other. Furthermore, a seal member is provided in a part of a gap between the nozzle box and the second-stage nozzle side structure, the gap being formed by combining the nozzle box and the second-stage nozzle side structure.

4 Claims, 4 Drawing Sheets

STEAM TURBINE

CROSS-REFERENCE TO RELATED APPLICATION

This application is based upon and claims the benefit of priority from Japanese Patent Application No. 2010-208105, filed on Sep. 16, 2010; the entire contents of which are incorporated herein by reference.

FIELD

Embodiments described herein relate generally to a steam turbine including a nozzle box into which high-temperature and high-pressure steam is led.

BACKGROUND

In a steam turbine, high-temperature and high-pressure steam supplied from a boiler passes through a steam inlet pipe to be led to a nozzle box having a circular ring-shaped steam passage, and is led to first-stage nozzles (first-stage stator blades). Generally, in order to reduce a force that acts on a casing of steam turbine, an outlet of a nozzle box into which steam is led is provided with first-stage nozzles. Further, there is also a nozzle box including first-stage nozzles and second-stage nozzles, in order to further reduce a force that acts on a casing of steam turbine.

FIG. 4 is a view showing a part of a meridian cross section in a horizontal direction of a conventional nozzle box 100 including first-stage nozzles 110 and second-stage nozzles 111. In the conventional nozzle box including the first-stage nozzles 110 and the second-stage nozzles 111, a wall portion on an outer peripheral side is extended in an axial direction of a turbine rotor to support a nozzle diaphragm 114 for supporting the second-stage nozzles 111, as shown in FIG. 4.

In the conventional nozzle box including the first-stage nozzles 110 and the second-stage nozzles 111 as described above, a welding rod is led from an upstream side to a downstream side of the first-stage nozzles 110 to weld the first-stage nozzles 110. For this reason, a depth of a weld groove portion 112 on the outer peripheral side (length of the weld groove portion 112 in the axial direction of the turbine rotor) becomes deeper than a depth of a weld groove portion 113 on an inner peripheral side, which results in an enormous amount of welding. Further, since the depth of the weld groove portion 112 on the outer peripheral side is deep, the manufacture becomes difficult. Further, a structure in which the nozzle box is formed to have a two-piece divided structure to reduce the depth of the weld groove portion 112 on the outer peripheral side can also be considered, but, leakage of steam from the divided portion becomes a problem.

DETAILED DESCRIPTION

In one embodiment, there are provided: a nozzle box having a circular ring-shaped steam passage into which steam is led from a steam inlet pipe and having, on a downstream portion of the steam passage, a plurality of first-stage nozzles in a circumferential direction; and a second-stage nozzle side structure in a cylindrical shape combined with the nozzle box and having a plurality of at least second-stage nozzles in a circumferential direction. Further, there are provided: at least a pair of abutment surfaces for sealing respectively provided in the nozzle box and the second-stage nozzle side structure, being not parallel to a turbine rotor axis and abutting each other; and a seal member provided in a part of a gap between the nozzle box and the second-stage nozzle side structure, the gap being formed by combining the nozzle box and the second-stage nozzle side structure.

Hereinafter, embodiments of the present invention will be described with reference to the drawings.

First Embodiment

Figure 1:
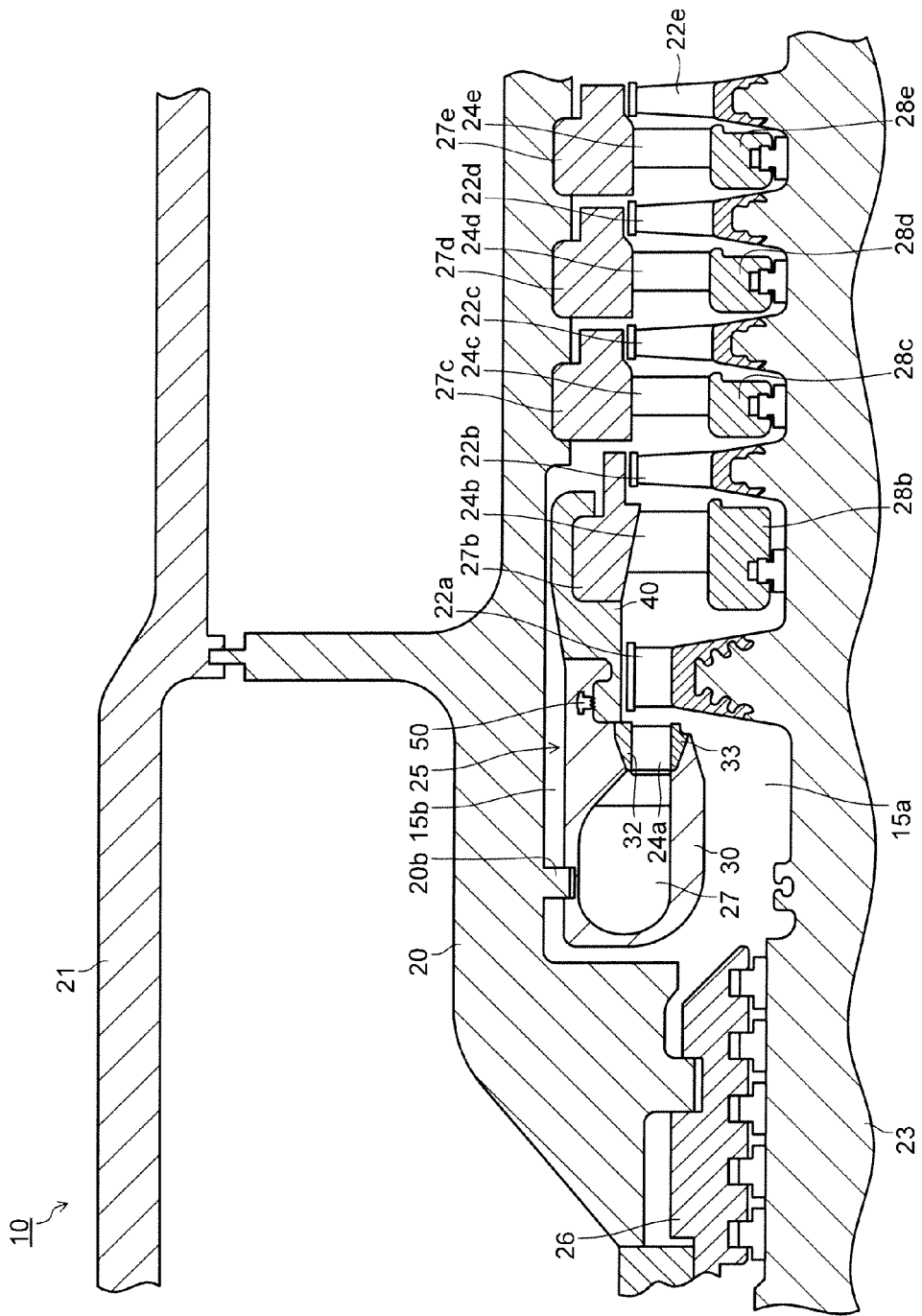
FIG. 1 is a view showing a meridian cross section of a steam turbine of a first embodiment in a position inclined by 45 degrees relative to a vertical direction.

FIG. 1 is a view showing a meridian cross section of a steam turbine 10 of a first embodiment in a position inclined by 45 degrees relative to a vertical direction.

As shown in FIG. 1, the steam turbine 10 includes, for example, a double-structure casing composed of an inner casing 20 and an outer casing 21 provided outside the inner casing 20. Further, a turbine rotor 23 in which rotor blades 22a, 22b, 22c, 22d, 22e are implanted is penetratingly provided in the inner casing 20. A plurality of each of the rotor blades 22a, 22b, 22c, 22d, 22e are respectively implanted in a circumferential direction to form a rotor blade cascade. This turbine rotor 23 is rotatably supported by a not-shown rotor bearing.

Further, on an inner periphery of the inner casing 20, nozzles 24a, 24b, 24c, 24d, 24e are arranged in an axial direction of the turbine rotor 23 so that the nozzles and the rotor blades 22a, 22b, 22c, 22d, 22e are alternately disposed. A plurality of each of the nozzles 24a, 24b, 24c, 24d, 24e are respectively disposed in the circumferential direction to form a nozzle cascade. The nozzle cascade and the rotor blade cascade form one turbine stage. Here, the first-stage nozzles 24a and the second-stage nozzles 24b are provided in a later-described nozzle box assembly 25.

In order to prevent leakage of steam, which is a working fluid, to the outside, a gland labyrinth portion 26 is provided between the turbine rotor 23 and each casing.

Further, in the steam turbine 10, a steam inlet pipe (not shown) is provided to penetrate through the outer casing 21 and the inner casing 20, and an end portion of the steam inlet pipe is communicated with and connected to a nozzle box 30 that forms a part of the nozzle box assembly 25. The nozzle box 30 includes a circular ring-shaped steam passage 27 in which steam led from the steam inlet pipe is spread in the circumferential direction.

Further, the nozzle box assembly 25 is fixed via a partition wall 20b projecting along a whole circumference in the circumferential direction of the inner periphery of the inner casing 20. By providing the partition wall 20b, a space surrounding the nozzle box assembly 25 is divided into an inner space 15a and an outer space 15b, thereby blocking the passage of steam between these spaces. Accordingly, it is possible to make most of steam flowing out of the first-stage nozzles 24a to be converted into effective work.

The steam flowing into the nozzle box 30 by passing through the steam inlet pipe is spread in the steam passage 27 to be led to the first-stage nozzles 24a provided on a downstream portion of the steam passage 27, and is ejected toward the first-stage rotor blades 22a. The ejected steam passes through steam passages between the nozzles 24b, 24c, 24d, 24e and the rotor blades 22b, 22c, 22d, 22e of respective stages to rotate the turbine rotor 23. Further, most of the steam having performed expansion work is discharged and passes through, for example, a low-temperature reheating pipe (not shown) to flow into a boiler (not shown).

Note that the structure of the steam turbine 10 is not limited to the above-described structure, and it is only required to use a steam turbine with a structure in which steam flows into the nozzle box 30 by passing through the steam inlet pipe.

Next, the nozzle box assembly 25 will be explained.

Figure 2:
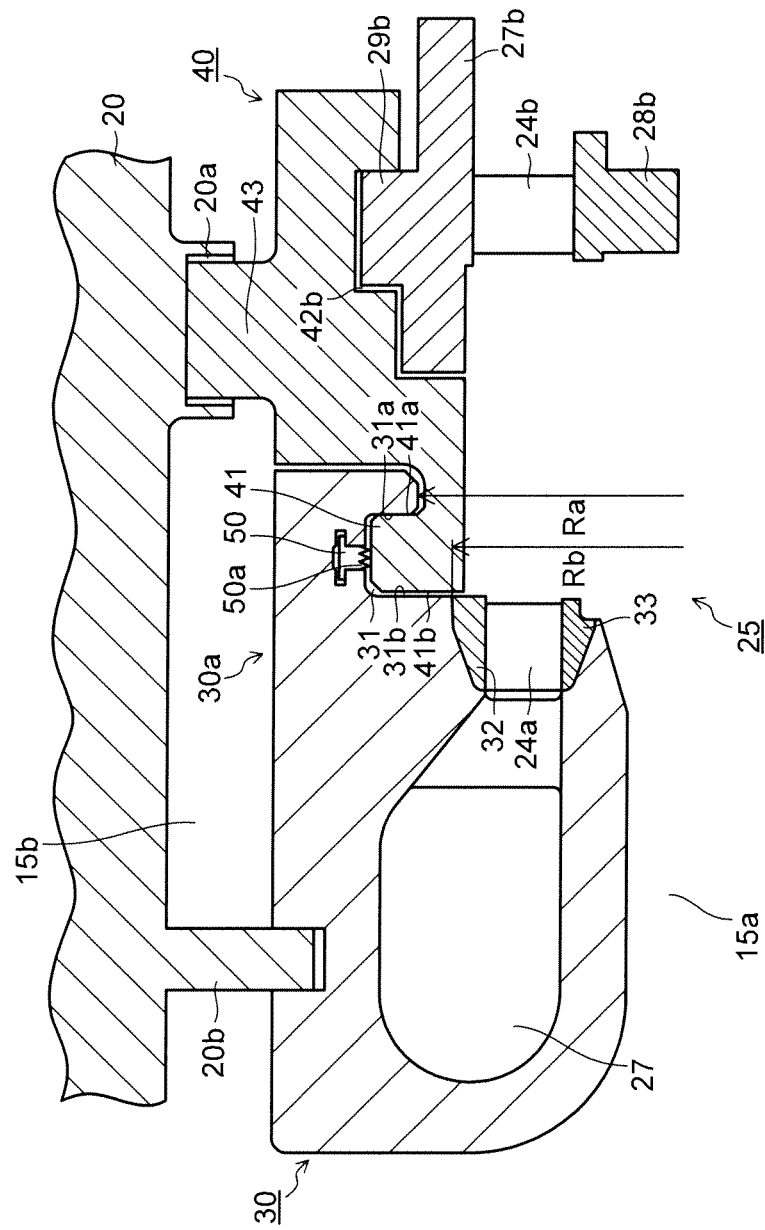
FIG. 2 is a view showing a part of a meridian cross section in a horizontal direction of a nozzle box assembly included in the steam turbine of the first embodiment.

FIG. 2 is a view showing a part of a meridian cross section in a horizontal direction of the nozzle box assembly 25 included in the steam turbine 10 of the first embodiment. Specifically, FIG. 2 shows a cross section on an upper surface side of a lower side structure of the nozzle box assembly 25 that is formed with a vertically two-piece divided structure.

As shown in FIG. 2, the nozzle box assembly 25 is formed by combining separated structures formed of the nozzle box 30 including the steam passage 27 and the first-stage nozzles 24a provided on the downstream portion of the steam passage 27, and a second-stage nozzle side structure 40 including the second-stage nozzles 24b. Here, an example in which the second-stage nozzle side structure 40 includes one stage of a nozzle cascade (the second-stage nozzle cascade) is described, but, the second-stage nozzle side structure 40 can also be structured to include two stages or more of nozzle cascades.

In the nozzle box 30, a wall portion on an outer peripheral side that forms the circular ring-shaped steam passage 27 is extended to the downstream side of the first-stage nozzles 24a. A distance in a radial direction Ra being a distance in the radial direction from a center axis of the turbine rotor to an inner peripheral surface of the extended portion 30a is greater than a distance in the radial direction Rb from the center axis to an outermost periphery of a weld groove portion 32 on an outer peripheral side formed at a time of welding the first-stage nozzles 24a to an outlet of the nozzle box 30. Specifically, the distance in the radial direction Ra from the center axis to the inner peripheral surface of the extended portion 30a is set to be greater than the distance in the radial direction Rb from the center axis to the outermost periphery of the weld groove portion 32 on the outer peripheral side, in order not to obstruct the movement of welding rod and the like at the time of welding the first-stage nozzles 24a to the outlet of the nozzle box 30.

As shown in FIG. 2, a depth of the weld groove portion 32 on the outer peripheral side (length of the weld groove portion 32 in the axial direction of the turbine rotor) is about the same as a depth of a weld groove portion 33 on the inner peripheral side (length of the weld groove portion 33 in the axial direction of the turbine rotor). A plurality of the first-stage nozzles 24a are fixed to the outlet of the nozzle box 30 along the circumferential direction by such weld groove portions 32, 33.

Further, on an inner peripheral side of the extended portion 30a, a groove-shaped fitting groove portion 31 is formed along the circumferential direction. On a bottom portion of the fitting groove portion 31, there is provided a seal member 50 along the circumferential direction to prevent leakage of steam between the fitting groove portion 31 and a fitting projecting portion 41 of the later-described second-stage nozzle side structure 40 fitted to the fitting groove portion 31. The seal member 50 includes a seal fin 50a that is brought into contact with the fitting projecting portion 41 of the second-stage nozzle side structure 40.

Further, as described above, the nozzle box 30 is fixed via the partition wall 20b projecting along the whole circumference in the circumferential direction of the inner periphery of the inner casing 20. By providing the partition wall 20b, the space surrounding the nozzle box assembly 25 is divided into the inner space 15a and the outer space 15b, thereby blocking the passage of steam between these spaces.

The second-stage nozzle side structure 40 has a cylindrical shape, and one end portion thereof is formed of the fitting projecting portion 41 fitted to the fitting groove portion 31 of the nozzle box 30. Further, on an inner peripheral side of the second-stage nozzle side structure 40, there is formed a fitting groove portion 42b that is fitted to a fitting projecting portion 29b formed on an outer periphery of a diaphragm outer ring 27b that supports the second-stage nozzles 24b from the outside, thereby performing positioning and fixing of the diaphragm outer ring 27b. Note that the second-stage nozzles 24b are supported by a diaphragm inner ring 28b from the inside. Further, the nozzles 24c, 24d, 24e on the downstream side of the second-stage nozzles 24b are supported between diaphragm outer rings 27c, 27d, 27e and diaphragm inner rings 28c, 28d, 28e, and fixed to the inner casing 20, similar to the conventional case, as shown in FIG. 1.

Further, positioning of the second-stage nozzle side structure 40 is performed by making a fitting projecting portion 43 formed on an outer surface of the structure fit to a fitting groove portion 20a that is formed on the inner peripheral side of the inner casing 20 to correspond to the fitting projecting portion 43. Note that the inner casing 20, the outer casing 21, the nozzle box assembly 25 and the like are formed with the vertically two-piece divided structure, so that, for example, the second-stage nozzle side structure 40 on the lower side is inserted from above into the inner casing 20 in which the nozzle box 30 is disposed, and is combined with the nozzle box 30.

Further, a side surface 41a on the downstream side of the fitting projecting portion 41 of the second-stage nozzle side structure 40 is formed to abut on a side surface 31a on the downstream side of the fitting groove portion 31 of the nozzle box 30. When a pair of these side surfaces 31a, 41a abut, the leakage of steam can be prevented, and thus the pair of these side surfaces 31a, 41a respectively function as abutment surfaces for sealing. Note that it is only required to provide at least one pair of such abutment surfaces for sealing, and it is also possible to provide such abutment surfaces for sealing on a plurality of portions.

Here, the nozzle box 30 is connected to the end portion of the steam inlet pipe (not shown) and fixed to the partition wall 20b of the inner casing 20, so that it is arranged at a predetermined position. Further, as described above, the positioning of the second-stage nozzle side structure 40 is performed by making the fitting projecting portion 43 fit to the fitting groove portion 20a of the inner casing 20, which enables the structure to move slightly in the axial direction of the turbine rotor. A pressure at the outlet of the nozzle box 30 (pressure between a side surface 31b on the upstream side of the fitting groove portion 31 of the nozzle box 30 and a side surface 41b on the upstream side of the fitting projecting portion 41 of the second-stage nozzle side structure 40 (pressure in the inner space 15a)) is higher than a pressure in a space between the nozzle box assembly 25 and the inner casing 20 (outer space 15b), so that a force to move the second-stage nozzle side structure 40 to the downstream side in the axial direction of the turbine rotor acts. Accordingly, the side surface 41a on the downstream side of the fitting projecting portion 41 of the second-stage nozzle side structure 40 abuts on the side surface 31a on the downstream side of the fitting groove portion 31 of the nozzle box 30.

Here, an example in which the side surface 41a on the downstream side of the fitting projecting portion 41 of the second-stage nozzle side structure 40 and the side surface 31a on the downstream side of the fitting groove portion 31 of the nozzle box 30, which function as the abutment surfaces for sealing, are formed in a direction orthogonal to the axial direction of the turbine rotor is described, but, the example is not limited to this. It is only required that the side surface 41a and the side surface 31a are not formed as cylindrical surfaces facing the center axis of the turbine rotor axis, namely, surfaces parallel to the turbine rotor axis and, for example, it is also possible that the side surface 41a and the side surface 31a form abutment surfaces for sealing having a predetermined angle, in a meridian cross section, with respect to a direction parallel to the axial direction of the turbine rotor.

As described above, according to the steam turbine 10 of the first embodiment, the nozzle box assembly 25 is structured by combining the separated structures formed of the nozzle box 30 and the second-stage nozzle side structure 40, which enables to reduce the depth of the weld groove portion 32 being a welded portion on the outer peripheral side of the first-stage nozzles 24a in the outlet of the nozzle box 30, to a level where it is about the same as the depth of the weld groove portion 33 on the inner peripheral side. Accordingly, it is possible to reduce the amount of welding for welding the first-stage nozzles.

Further, since the surface being a part of the nozzle box 30 and the surface being a part of the second-stage nozzle side structure 40 abut each other, it is possible to prevent the leakage of steam. Further, by providing the seal member 50, it is possible to prevent the leakage of steam more securely.

Note that, although the above-described embodiment describes an example in which the seal member 50 is provided between the bottom portion of the fitting groove portion 31 and a projecting surface of the fitting projecting portion 41, being a part of the gap between the nozzle box 30 and the second-stage nozzle side structure 40, the gap being formed by combining the nozzle box 30 and the second-stage nozzle side structure 40, the position at which the seal member 50 is provided is not limited to this. The seal member 50 is only required to be provided in a part of the gap between the nozzle box 30 and the second-stage nozzle side structure 40, the gap being formed by combining the nozzle box 30 and the second-stage nozzle side structure 40. It is also possible that the seal member 50 is provided, for example, on a side of space formed between the nozzle box assembly 25 and the inner casing 20 in which outer peripheral surfaces of the nozzle box 30 and the second-stage nozzle side structure 40 are opposed.

Second Embodiment

Figure 3:
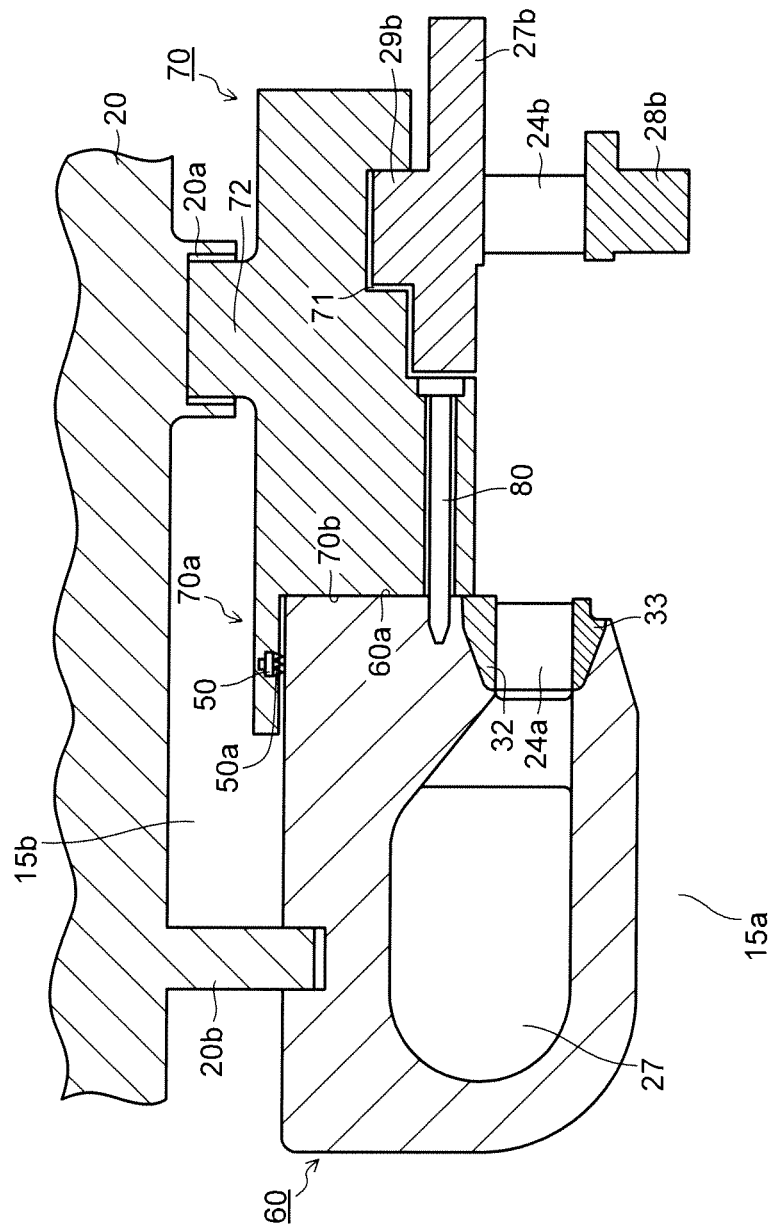
FIG. 3 is a view showing a part of a meridian cross section in a horizontal direction of a nozzle box assembly included in a steam turbine of a second embodiment.
Figure 4:
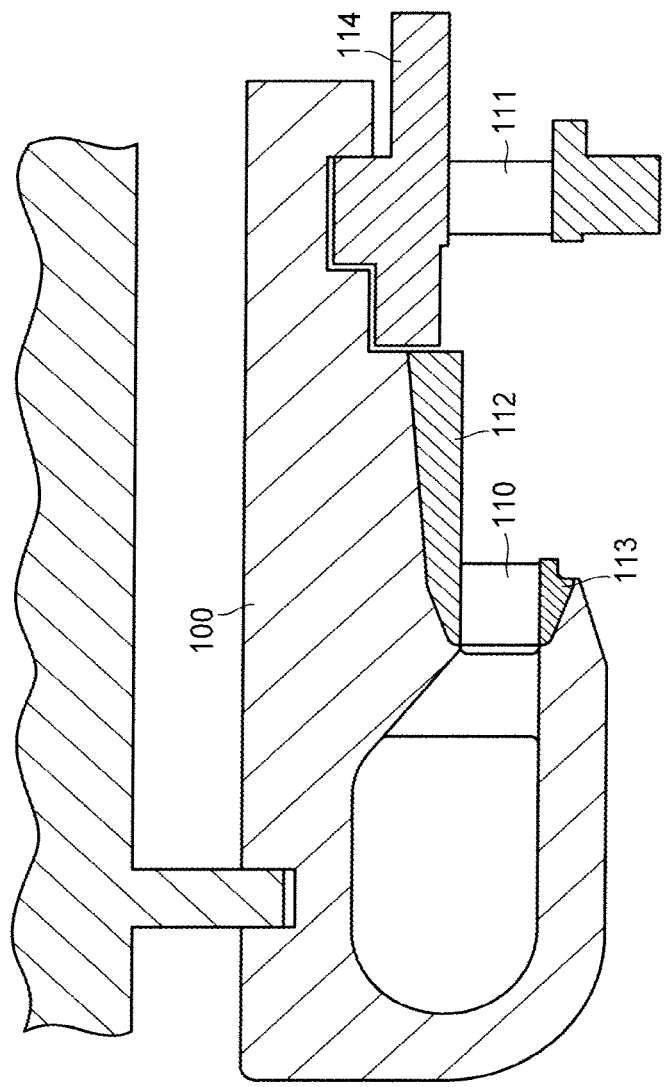
FIG. 4 is a view showing a part of a meridian cross section in a horizontal direction of a conventional nozzle box including first-stage nozzles and second-stage nozzles.

FIG. 3 is a view showing a part of a meridian cross section in a horizontal direction of a nozzle box assembly 25 included in a steam turbine 10 of a second embodiment. Specifically, FIG. 3 shows a cross section on an upper surface side of a lower side structure of the nozzle box assembly 25 that is formed with a vertically two-piece divided structure. Note that component parts which are the same as component parts of the nozzle box assembly 25 included in the steam turbine 10 of the first embodiment are denoted by the same reference numerals, and overlapped explanation thereof will be omitted or simplified.

As shown in FIG. 3, the nozzle box assembly 25 is formed by combining separated structures formed of a nozzle box 60 including the steam passage 27 and the first-stage nozzles 24a, and a second-stage nozzle side structure 70 including the second-stage nozzles 24b. Here, an example in which the second-stage nozzle side structure 70 includes one stage of a nozzle cascade (the second-stage nozzle cascade) is described, but, the second-stage nozzle side structure 70 can also be structured to include two stages or more of nozzle cascades.

In the nozzle box 60, wall portions on the outer peripheral side and the inner peripheral side that form the circular ring-shaped steam passage 27, are formed so that lengths thereof in the axial direction of the turbine rotor become about the same. Further, as shown in FIG. 3, the depth of the weld groove portion 32 on the outer peripheral side (length of the weld groove portion 32 in the axial direction of the turbine rotor) is about the same as the depth of the weld groove portion 33 on the inner peripheral side (length of the weld groove portion 33 in the axial direction of the turbine rotor). A plurality of the first-stage nozzles 24a are fixed to the outlet of the nozzle box 60 along the circumferential direction by such weld groove portions 32, 33.

Further, the nozzle box 60 is fixed via the partition wall 20b projecting along the whole circumference in the circumferential direction of the inner periphery of the inner casing 20. By providing the partition wall 20b, a space surrounding the nozzle box assembly 25 is divided into the inner space 15a and the outer space 15b, thereby blocking the passage of steam between these spaces.

The second-stage nozzle side structure 70 has a cylindrical shape, and on one end portion thereof, there are provided an extended portion 70a extended in the axial direction of the turbine rotor along the outer periphery of the wall portion on the outer peripheral side of the nozzle box 60, and an end surface 70b abutted on an end surface 60a which is orthogonal to the axial direction of the turbine rotor, on the downstream side of the wall portion on the outer peripheral side of the nozzle box 60. When these end surfaces 60a, 70b abut, the leakage of steam can be prevented, and thus these end surfaces 60a, 70b respectively function as abutment surfaces for sealing. Further, the second-stage nozzle side structure 70 is fixed to the nozzle box 60 by a bolt 80 by making the end surface 70b abut on the end surface 60a of the nozzle box 60.

Here, an example in which the end surface 70b of the second-stage nozzle side structure 70 and the end surface 60a of the nozzle box 60, which function as the abutment surfaces for sealing, are formed in a direction orthogonal to the axial direction of the turbine rotor is described, but, the example is not limited to this. It is only required that the end surface 70b and the end surface 60a are not formed as cylindrical surfaces facing the center axis of the turbine rotor axis, namely, surfaces parallel to the turbine rotor axis and, for example, it is also possible that the end surface 70b and the end surface 60a form abutment surfaces for sealing having a predetermined angle, in a meridian cross section, with respect to a direction parallel to the axial direction of the turbine rotor.

Further, in the second-stage nozzle side structure 70, there is formed a fitting groove portion 71 that is fitted to the fitting projecting portion 29b formed on the outer periphery of the diaphragm outer ring 27b that supports the second-stage nozzles 24b from the outside, thereby performing positioning and fixing of the diaphragm outer ring 27b. Note that the second-stage nozzles 24b are supported by the diaphragm inner ring 28b from the inside. Further, positioning of the second-stage nozzle side structure 70 is performed by making a fitting projecting portion 72 formed on an outer surface of the structure fit to the fitting groove portion 20a that is formed on the inner peripheral side of the inner casing 20 to correspond to the fitting projecting portion 72. Note that when the positioning and the like of the second-stage nozzle side structure 70 can be performed by fixing the nozzle box 60 and the second-stage nozzle side structure 70 by bolting, it is not necessary to provide the structure in which the positioning of the second-stage nozzle side structure 70 is performed on the inner peripheral side of the inner casing 20.

Further, on an inner peripheral side of the extended portion 70a of the second-stage nozzle side structure 70, there is provided the seal member 50 along the circumferential direction. The seal member 50 includes a seal fin 50a that is brought into contact with the outer periphery of the wall portion on the outer peripheral side of the nozzle box 60. By providing the seal member 50, it is possible to prevent leakage of steam from a gap between the extended portion 70a of the second-stage nozzle side structure 70 and the wall portion on the outer peripheral side of the nozzle box 60.

As described above, according to the steam turbine 10 of the second embodiment, the nozzle box assembly 25 is structured by combining the separated structures formed of the nozzle box 60 and the second-stage nozzle side structure 70, which enables to reduce the depth of the weld groove portion 32 being the welded portion on the outer peripheral side of the first-stage nozzles 24a in the outlet of the nozzle box 60, to a level where it is about the same as the depth of the weld groove portion 33 on the inner peripheral side. Accordingly, it is possible to reduce the amount of welding for welding the first-stage nozzles.

Further, since the surface being a part of the nozzle box 60 and the surface being a part of the second-stage nozzle side structure 70 abut each other, it is possible to prevent the leakage of steam. Further, by providing the seal member 50, it is possible to prevent the leakage of steam more securely.

According to the embodiments described above, it becomes possible to provide the divided structure, to reduce the amount of welding for welding the first-stage nozzles, and to prevent the leakage of steam in the nozzle box.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A steam turbine, comprising:
   an outer casing;
   an inner casing provided inside the outer casing;
   a nozzle box having a circular ring-shaped steam passage into which steam is led from a steam inlet pipe and having, on a downstream portion of the steam passage, a plurality of first-stage nozzles in a circumferential direction, the steam passage being provided inside the inner casing, the first-stage nozzles being welded directly to the downstream portion of the steam passage;
   a second-stage nozzle side structure in a cylindrical shape being separable from and combined with the nozzle box and having a plurality of second-stage nozzles in a circumferential direction, the second-stage nozzle side structure having a fitting portion on an outer surface thereof fitted to the inner casing;
   at least a pair of abutment surfaces abutting each other and configured to seal, the surfaces being respectively provided in the nozzle box and the second-stage nozzle side structure, without being parallel to a turbine rotor axis; and
   a seal member provided in a part of a gap between the nozzle box and the second-stage nozzle side structure, the gap being formed by combining the nozzle box and the second-stage nozzle side structure.

2. The steam turbine according to claim 1, wherein the nozzle box and the second-stage nozzle side structure are combined through a fitting structure.

3. The steam turbine according to claim 1, wherein the nozzle box and the second-stage nozzle side structure are combined by bolting.

4. The steam turbine according to claim 1, wherein the nozzles provided in the second-stage nozzle side structure are supported between a diaphragm outer ring and a diaphragm inner ring provided to correspond to the diaphragm outer ring.

\* \* \* \* \*